(12) United States Patent
Marsden et al.

(10) Patent No.: US 11,667,290 B2
(45) Date of Patent: Jun. 6, 2023

(54) METHOD FOR REDUCING VEHICLE FUEL CONSUMPTION DURING COASTING

(71) Applicant: JAGUAR LAND ROVER LIMITED, Warwickshire (GB)

(72) Inventors: Paul Marsden, Coventry (GB); Thomas Valero, Coventry (GB); Thomas Mourre, Coventry (GB); Alex Plianos, Coventry (GB); Pavan Kumar, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 216 days.

(21) Appl. No.: 16/480,460

(22) PCT Filed: Jan. 19, 2018

(86) PCT No.: PCT/EP2018/051314
§ 371 (c)(1),
(2) Date: Jul. 24, 2019

(87) PCT Pub. No.: WO2018/138010
PCT Pub. Date: Aug. 2, 2018

(65) Prior Publication Data
US 2019/0351908 A1 Nov. 21, 2019

(30) Foreign Application Priority Data

Jan. 26, 2017 (GB) ...................................... 1701312

(51) Int. Cl.
*B60W 30/18* (2012.01)
*B60W 50/00* (2006.01)

(52) U.S. Cl.
CPC .. *B60W 30/18072* (2013.01); *B60W 50/0097* (2013.01); *B60W 2030/1809* (2013.01);
(Continued)

(58) Field of Classification Search
CPC ....... B60W 30/18072; B60W 50/0097; B60W 2030/18081; B60W 2030/1809;
(Continued)

(56) References Cited

U.S. PATENT DOCUMENTS

| 5,807,209 A | 9/1998 | Matsubara et al. |
| 10,207,710 B1 * | 2/2019 | Daims ............. B60W 30/18072 |

(Continued)

OTHER PUBLICATIONS

Bifulco, G. N., Simonelll, F., & Di Pace, R. (Jun. 2008). Experiments toward an human-like adaptive cruise control, in 2008 IEEE intelligent vehicles symposium (pp. 919-924). IEEE. (Year: 2008).*

(Continued)

*Primary Examiner* — Aniss Chad
*Assistant Examiner* — Stephanie T Su
(74) *Attorney, Agent, or Firm* — Carlson, Gaskey & Olds, P.C.

(57) ABSTRACT

Some embodiments of the present invention comprise a method of controlling a powertrain of a vehicle, the powertrain comprising drive torque means, a transmission and a driveline, the drive torque means comprising an internal combustion engine, the method comprising: detecting that coasting entry criteria have been met; causing the powertrain to assume a first coasting mode for a first time period in which the drive torque means delivers positive drive torque to the driveline to substantially balance powertrain losses; determining a value for at least one parameter, the or each parameter being indicative of: a probability that a demand will be made for torque to be delivered to the driveline in addition to torque delivered to substantially balance powertrain losses; or a probability that a demand will be made for braking of the vehicle; and setting the value of the first time period in dependence on the value of the or each parameter.

14 Claims, 3 Drawing Sheets

(52) U.S. Cl.
CPC ............ *B60W 2030/18081* (2013.01); *B60W 2050/0075* (2013.01); *B60W 2540/12* (2013.01); *B60W 2556/10* (2020.02); *B60W 2710/083* (2013.01)

(58) Field of Classification Search
CPC ..... B60W 2050/0089; B60W 2540/12; B60W 2710/083; B60W 50/10; B60W 2510/06
See application file for complete search history.

(56) References Cited

U.S. PATENT DOCUMENTS

| | | | |
|---|---|---|---|
| 2005/0054480 A1* | 3/2005 | Ortmann | F16H 61/0437 903/910 |
| 2006/0155453 A1* | 7/2006 | Han | F16H 61/0213 701/54 |
| 2009/0017989 A1 | 1/2009 | Karlsson et al. | |
| 2009/0118936 A1* | 5/2009 | Heap | B60K 6/365 701/54 |
| 2011/0021311 A1* | 1/2011 | Kim | B60W 30/19 477/3 |
| 2011/0039656 A1 | 2/2011 | Burow et al. | |
| 2011/0231072 A1 | 9/2011 | Roth et al. | |
| 2011/0238248 A1 | 9/2011 | Suzuki et al. | |
| 2012/0234123 A1 | 9/2012 | Whitney et al. | |
| 2013/0116089 A1* | 5/2013 | Wegner | G05D 13/04 477/110 |
| 2014/0236443 A1* | 8/2014 | Rodrigues | B60K 28/165 701/69 |
| 2015/0258973 A1* | 9/2015 | Hawkins | B60K 6/48 701/22 |
| 2017/0137029 A1* | 5/2017 | Dynes | B60W 30/18072 |
| 2018/0105158 A1* | 4/2018 | Namuduri | B60W 30/18127 |
| 2018/0134272 A1* | 5/2018 | Doering | F02D 41/0225 |
| 2019/0168731 A1* | 6/2019 | Lee | B60W 20/20 |

OTHER PUBLICATIONS

Bifulco, G. N., Simonelli, F., & Di Pace, R. (Jun. 2008). Experiments toward an human-like adaptive cruise control. In 2008 IEEE intelligent vehicles symposium (pp. 919-924). IEEE. (Year: 2008).*
Combined Search and Examination Report under Sections 17 and 18(3) for Application No. GB1800872.2 dated Jul. 23, 2018.
International Search Report and Written Opinion of the International Searching Authority for International application No. PCT/EP2018/051314 dated Jun. 18, 2018.
Combined Search and Examination Report under Sections 17 and 18(3) for Application No. GB1701312.9 dated Jul. 21, 2017.

* cited by examiner

METHOD FOR REDUCING VEHICLE FUEL CONSUMPTION DURING COASTING

TECHNICAL FIELD

This invention relates to a method of reducing energy consumption of a vehicle, in particular, but not exclusively, by controlling the status of an internal combustion and a transmission of the vehicle. Aspects of the invention relate to a method, to a controller, to a vehicle, to a non-transitory computer readable carrier medium carrying computer readable code, to a computer program product, to a non-transitory computer readable medium and to a processor.

BACKGROUND

Internal combustion engines of vehicles rely upon fuel injection for effective management of fuelling. Fuel must be admitted to the engine to avoid stalling thereof. In one strategy for minimizing fuel consumption, the engine may be automatically stopped when the vehicle is temporarily halted, and automatically re-started when the accelerator pedal is advanced.

In so-called 'mild hybrid electric vehicles' (MHEVs), an internal combustion (IC) engine is provided with an electric machine in the form of a motor/generator. The electric machine is operable as a motor to provide additional torque to provide torque assist for the engine to drive a driveline via a transmission and may also be used for starting the engine. The electric machine may also be operated as a generator to recharge a battery of the vehicle.

During coasting in which the IC engine remains connected to a driveline of the vehicle via a transmission, the vehicle is allowed to roll, without application of the accelerator pedal. In this condition fuel may be cut-off (so-called 'deceleration fuel shut-off') and the vehicle slowly decelerates due to engine braking ('engine over-run') and other external factors. Such coasting may be referred to as 'engine-connected coasting' and includes the (zero throttle) condition in which the vehicle can maintain speed without assistance from the IC engine or electric machine, such as rolling downhill, as well as the (zero throttle) level-driving condition in which speed is deliberately permitted to fall without braking of the vehicle wheels by means of the braking system. During engine-connected coasting IC engine speed is a function of the speed of the vehicle and the gear ratio of the transmission, so is typically much higher than idle speed. In an IC engine relatively high friction and pumping losses cannot be avoided, notwithstanding that fuel is cut-off. Eventually, engine-connected coasting may cause the engine speed to fall to a level at which fuel must be readmitted (the fuel cut-in speed) to avoid stalling of the engine upon fuelling. It is to be understood that the fuel cut-in speed is generally close to normal engine idle speed.

One known method of reducing fuel consumption is to shift the vehicle transmission into neutral, so that engine speed can drop to idle. Although possible with a manual transmission, the technique may not be possible, or not appropriate for an automatic transmission. Most importantly however, in an IC engine, fuel must be admitted to the engine to keep it running at idle speed, so that from a fuel economy viewpoint, the advantage of deceleration fuel shut-off is lost, but lower friction windage and pumping losses may apply.

Various control strategies are known for controlling powertrain operations such as the switching on and off of the IC engine, controlling the electric machine to provide torque assistance and controlling a coupling between the engine and driveline. These operations may allow for engine off coasting, during which the IC engine is switched off and the transmission is disconnected from the engine, providing a real fuel economy benefit by reducing friction losses and removing the need to idle fuel the IC engine.

One option is to control the powertrain strictly by means of a drive input algorithm. However, this does not provide for tailoring vehicle response according to particular scenarios, leading to unnecessarily slow response times to driver torque demand, rapid changes between IC engine on/off and transmission connected/disconnected states, resulting in suboptimal fuel economy. For example, operating on a relatively simple logic wherein application of a brake exits engine-off coasting would cause the vehicle to restart the engine when the brake was applied, when in fact driver intent is to stop the vehicle. This results in driver dissatisfaction and lower fuel economy.

Operating on more complex rule-based logic may result in driver confusion in some circumstances.

It is an aim of embodiments of the present invention to provide a method of vehicle control that enables reduced fuel consumption and/or enhanced drivability in an MHEV vehicle.

SUMMARY OF THE INVENTION

In one aspect of the present invention for which protection is sought there is provided a method of controlling a powertrain of a vehicle, the powertrain comprising drive torque means, a transmission and a driveline, the drive torque means comprising an internal combustion engine, the method comprising:
  detecting that coasting entry criteria have been met;
  causing the powertrain to assume a first coasting mode for a first time period in which the drive torque means delivers torque from an output shaft of the engine to the driveline to substantially balance powertrain losses;
  determining a value for at least one parameter, the or each parameter being indicative of: a probability that a demand will be made for torque to be delivered to the driveline in addition to torque delivered to substantially balance powertrain losses; or a probability that a demand will be made for braking of the vehicle; and
  setting the value of the first time period in dependence on the value of the or each parameter.

Substantially balancing powertrain losses entails delivering a level of torque to the driveline that is commensurate with, and therefore neutralises, any load that would otherwise be applied to the driveline by an idle powertrain due to inertia and frictional losses. In other words, the amount of positive torque delivered to the driveline by the drive torque means is such that the net torque delivered to the driveline by the drive torque means is substantially zero. In this way, the vehicle emulates conventional coasting from a driver's perspective while in the first coasting mode, even though the drive torque means may remain coupled to the driveline.

Powertrain losses may include internal losses, as well as losses that could be considered as originating from outside of the powertrain, for example auxiliary vehicle systems driven by the engine.

The coasting entry criteria may comprise release of an accelerator pedal and a brake pedal of the vehicle, and the vehicle speed exceeding a predetermined value. Alternatively, the coasting entry criteria may comprise torque not being required to be delivered to the driveline to maintain a speed set by a cruise control system within a predetermined range. The method can therefore be applied to a vehicle in which the acceleration and braking of the vehicle are manually controlled by a driver or in which the acceleration of the vehicle is automatically controlled by a cruise control system.

The method may comprise causing the powertrain to assume a second coasting mode for a second time period in which the drive torque means is disconnected from the driveline and the internal combustion engine maintains an idle speed.

The method may comprise causing the powertrain to assume a third coasting mode for a third time period, in which the drive torque means is disconnected from the driveline and the drive torque means is switched off. In either case, the method may also comprise resuming the first coasting mode from either the second coasting mode or the third coasting mode in dependence on the value of the or each parameter, in particular if a demand for acceleration or braking of the vehicle is expected to be made. This beneficially prepares the powertrain to respond more quickly to the demand for acceleration by providing additional torque. Alternatively, the method may resume the second coasting mode from the third coasting mode in dependence on the value of the or each parameter indicative of a probability that a demand for torque to be delivered to the driveline in addition to torque delivered to substantially balance powertrain losses or a demand for vehicle braking will be made. This provides an intermediate step before returning to the first coasting mode, noting that the powertrain can respond more quickly from the second coasting mode than from the third coasting mode.

The drive torque means optionally delivers torque from an output shaft of the engine to the driveline.

The value of the first time period may take into account both an expected demand for additional torque and an expected braking demand.

The demand for additional torque and/or the demand for braking of the vehicle may be made by a driver of the vehicle or by a cruise control system in order to maintain a set speed within a predetermined range.

Optionally, determining a value for a parameter indicative of the probability that a demand will be made for additional torque and/or a value for a parameter indicative of the probability that a demand for braking of the vehicle will be made comprises determining the probability that a demand for additional torque and/or a demand for braking of the vehicle respectively will be made substantially at that instant.

Optionally, determining a value for a parameter indicative of the probability that a demand will be made for additional torque and/or a value for a parameter indicative of the probability that a demand for braking of the vehicle will be made comprises determining the probability that a demand for additional torque and/or a demand for braking of the vehicle respectively will be made prior to assuming the third coasting mode.

Optionally, determining a value for a parameter indicative of the probability that a demand will be made for additional torque and/or a value for a parameter indicative of the probability that a demand for braking of the vehicle will be made comprises receiving information indicative of at least one selected from amongst the speed and/or location of traffic ahead of the vehicle, the state of one or more traffic control signals ahead of the vehicle and information indicative of the geographical location of the vehicle.

The method may comprise determining an expected coasting period for the vehicle, and setting the value of the first time period in accordance with the estimated coasting period. Values of second and third time periods may also be set in accordance with the expected coasting period. For example, the expected coasting period may be determined from data received from on-board systems such as navigation systems or radar systems. The expected coasting time may also take an indicated driving style based on historical driving data into account.

The method may comprise setting the value of the first time period in accordance with historical driving data. Such data may be gathered over several driving cycles, for example, and may be representative of a driving style of a driver of the vehicle. Values of second and third time periods may also be set in accordance with the historical driving data.

The drive torque means optionally comprises an electric machine that delivers torque from the output shaft of the engine to the driveline in the first coasting mode, in which case the method may comprise delivering torque produced by both the electric machine and the engine from the output shaft of the engine to the driveline in the first coasting mode. Such embodiments may further comprise determining proportions of the torque delivered to the driveline that should be produced by the electric machine and the engine respectively for optimised efficiency, and controlling the powertrain so that the engine and the electric machine produce the determined respective proportions of torque. Such methods may comprise determining proportions of the torque delivered to the driveline that should be produced by the electric machine and the engine respectively to consume the least power in the first coasting mode. Alternatively, or in addition, when determining the division of torque between the engine and the electric machine the method may take into account future energy consumption that may result from ceasing operation in one of the coasting modes. For example, when determining whether to generate torque using only the electric machine while coasting, the method may consider the amount of electrical power that will be consumed to start the engine subsequently and check battery resources to ensure viability of the operating mode.

In a further aspect of the present invention for which protection is sought there is provided an electronic controller for controlling a powertrain of a vehicle, the powertrain comprising drive torque means, a transmission and a driveline, the drive torque means comprising an internal combustion engine, the controller comprising processing means, wherein the processing means comprises an electronic processor having an electrical input for receiving information indicative that coasting entry criteria have been met, and an electronic memory device electrically coupled to the electronic processor and having instructions stored therein, wherein the processor is configured to:

access the memory device and execute the instructions stored therein such that it is operable to cause the powertrain to assume a first coasting mode for a first time period in which the drive torque means delivers torque to the driveline to substantially balance powertrain losses;

determine a value for at least one parameter, the or each parameter being indicative of: a probability that a demand will be made for torque to be delivered to the driveline in addition to torque delivered to substantially balance powertrain losses; or a probability that a demand will be made for braking of the vehicle; and set the value of the first time period in dependence on the value of the or each parameter.

The coasting entry criteria may comprise release of an accelerator pedal and a brake pedal of the vehicle, and the vehicle speed exceeding a predetermined value. Alternatively, the coasting entry criteria may comprise torque not being required to be delivered to the driveline to maintain a speed set by a cruise control system within a predetermined range.

The controller may be configured to cause the powertrain to assume a second coasting mode for a second time period in which the drive torque means is disconnected from the driveline and the internal combustion engine maintains an idle speed.

The controller may be configured to cause the powertrain to assume a third coasting mode in which the drive torque means is disconnected from the driveline and the drive torque means is switched off. Determining a value for a parameter indicative of the probability that a demand for additional torque will be made and/or a value for a parameter indicative of the probability that a demand for braking of the vehicle will be made optionally comprises determining the probability that a demand for additional torque and/or braking of the vehicle will be made prior to assuming the third coasting mode.

The demand for additional torque and/or braking of the vehicle may be made by a driver of the vehicle or by a cruise control system in order to maintain a set speed within a predetermined range.

Determining a value for a parameter indicative of the probability that a demand for additional torque will be made and/or a value for a parameter indicative of the probability that a demand for braking of the vehicle will be made may comprise determining the probability that a demand for additional torque and/or braking of the vehicle will be made substantially at that instant.

Determining a value for a parameter indicative of the probability that a demand for additional torque will be made and/or a value for a parameter indicative of the probability that a demand for braking of the vehicle will be made may comprise determining the probability that a demand for additional torque and/or braking of the vehicle will be made prior to assuming the third coasting mode.

The controller may be configured such that determining a value for a parameter indicative of the probability that a demand for additional torque will be made and/or a value for a parameter indicative of the probability that a demand for braking of the vehicle will be made comprises receiving information indicative of at least one selected from amongst the speed and/or location of traffic ahead of the vehicle, the state of one or more traffic control signals ahead of the vehicle and information indicative of the geographical location of the vehicle.

In an aspect of the present invention for which protection is sought there is provided a vehicle comprising the electronic controller according to a preceding aspect.

In an aspect of the invention for which protection is sought there is provided a non-transitory computer readable carrier medium carrying computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a non-transitory computer readable medium carrying computer readable code which when executed causes a vehicle to carry out the method of another aspect.

In an aspect of the invention for which protection is sought there is provided a processor arranged to implement the method of another aspect, or the computer program product of another aspect.

Some embodiments of the present invention provide a method of controlling a powertrain of a vehicle, the vehicle comprising drive torque means comprising an internal combustion engine and optionally an electric machine, a transmission and a driveline, the method comprising: detecting that coasting entry criteria have been met; causing the powertrain to assume a first coasting mode for a first time period in which the powertrain delivers torque to the driveline to substantially balance powertrain losses; subsequent to assuming the first coasting mode, causing the powertrain to assume a second coasting mode for a second time period in which the drive torque means is disconnected from the driveline and the drive torque means continues to rotate in an idle mode; and subsequent to assuming the second coasting mode, causing the powertrain to assume a third coasting mode in which the drive torque means is disconnected from the driveline and the drive torque means is switched off.

Optionally, detecting coasting entry criteria have been met comprises detecting that neither an accelerator pedal or brake pedal of the vehicle are depressed and that the vehicle speed exceeds a predetermined value. Alternatively, detecting coasting entry criteria have been met comprises detecting that torque is not required to be delivered to the driveline to maintain a speed set by a cruise control system within a predetermined range.

Embodiments of the invention may be implemented in any suitable manner, and may for example be incorporated in an electronic control unit of the motor or transmission, and operable in response to input signals of e.g. road speed, accelerator pedal position, motor speed, transmission speed and clutch pressure. The control unit may include a memory having thresholds and stored characteristics or algorithms, to ensure that motor speed is maintained at the lowest possible value during implementation of the strategy. Such characteristics can be determined empirically by suitably qualified staff to the intent that the strategy can be automatically enabled and disabled without affecting driveability of the vehicle or being otherwise noticeable to the vehicle driver.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example features disclosed in connection with one embodiment are applicable to all embodiments unless such features are incompatible.

BRIEF DESCRIPTION OF DRAWINGS

The present invention will now be described, by way of example only, with reference to the accompanying drawings in which:—

DETAILED DESCRIPTION

Figure 1:
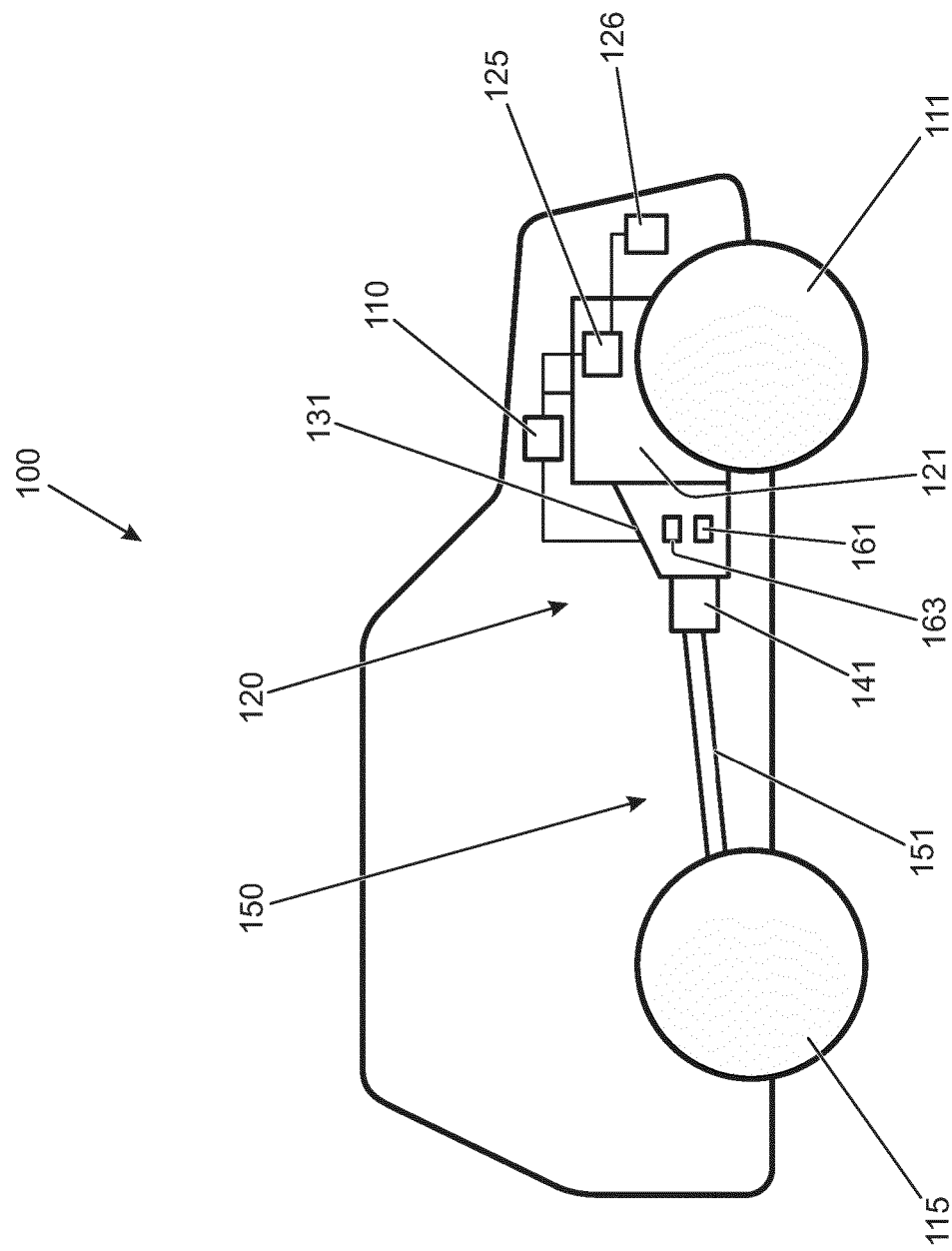
FIG. 1 illustrates a mild hybrid electric vehicle (MHEV) according to an embodiment of the present invention having an engine, belt-integrated starter/generator (BISG) and transmission that may be disconnected from a driveline.

FIG. 1 is a schematic illustration of a mild hybrid electric vehicle (MHEV) 100 according to an embodiment of the present invention. The vehicle 100 has a conventional internal combustion (IC) engine 121 provided with an electric machine in the form of a belt-integrated starter/generator (BISG) 125 and battery 126 for powering the BISG 126, and an automatic transmission 131 configured to receive torque from an output shaft (not shown) of the engine 121.

As is conventional for a MHEV arrangement, the BISG 125 is configured so that it is operable to supply torque to the output shaft of the engine 121 when the engine 121 is operating, thereby to provide torque-assist and/or electrical power generation functionality. Moreover, the BISG 125 can supply torque to the engine output shaft when the engine 121 is idling or deactivated. So, the engine 121 and the BISG 125 each define drive torque means that are operable either individually or in combination to deliver torque to the transmission 131.

The automatic transmission 131 is coupled to a driveline 150 that includes a power transfer unit (PTU) 141 and rear drive shaft 151. The engine 121 (including BISG 125), battery 126, transmission 131 and driveline 150 are collectively referred to as a powertrain 120 of the vehicle 100.

The PTU 141 is operable in one of a 2 wheel drive configuration in which it is arranged to drive a pair of rear wheels 115 of the vehicle 100 only or a 4 wheel drive configuration in which it is arranged to drive the pair of rear wheels 115 and in addition a pair of front wheels 111. The automatic transmission 131 may be disconnected from the driveline 150 when required.

The vehicle 100 has a controller 110 that is configured to run a software program that determines, at a given moment in time, the optimal operating state of the engine 121 (on or off), BISG 125 (acting as a motor, a generator, or neither), and transmission 131 (connected to the driveline 150 or disconnected from the driveline).

The controller 110 has a predictive energy optimisation (PEO) function that employs inputs from a front forward-looking RADAR system and satellite-based navigation system to determine the probability that a driver 'change of mind' (CHOM) event will occur in which a change takes place in respect of (a) whether or not a driver is demanding powertrain torque by depression of an accelerator pedal 161 or (b) whether or not a driver is demanding brake torque by depression of a brake pedal 163. When the accelerator pedal 161 is not depressed, the controller 110 generates a parameter A_CHOM indicative of the probability that a driver CHOM event will occur in which the driver depresses the accelerator pedal 161.

Similarly, when the brake pedal 163 is not depressed the controller 110 generates a parameter B_CHOM indicative of the probability that a driver CHOM event will occur in which the driver depresses the brake pedal 163.

It is noted that a driver is not likely to press the accelerator pedal 161 and the brake pedal 163 simultaneously, and so the values for A_CHOM and B_CHOM will have an inverse relationship so that when the value for A_CHOM is high, the value for B_CHOM is low; and vice-versa.

It follows that A_CHOM and B_CHOM may be considered indicative of one another, and may even be combined as a parameter AB_CHOM that indicates a probability that either acceleration or braking will be requested.

In the present embodiment, the controller 110 receives a signal from a RADAR system controller indicative of the location and speed of vehicles ahead of the vehicle 100 that have been detected by the RADAR system. The controller 110 also determines the location of junctions and road intersections ahead of the vehicle 100, including those associated with a traffic roundabout, traffic control signals or the like, based on location information from the satellite-based navigation system and road map information. The road map information is stored in a database of a satellite navigation system carried by the vehicle 100. Junctions and road intersections may be referred to as 'attributes' of a route.

In some embodiments the controller 110 may have a dedicated road map information database stored in a memory of the controller 110. Based on the information from the RADAR system, the location information and road map information, the PEO function determines the values of parameters A_CHOM and B_CHOM. By way of illustration, it is to be understood that if the PEO function determines, based on the location and map information, that the vehicle 100 is approaching a junction at which traffic lights are present, the PEO function may determine that the driver is less likely to depress the accelerator pedal if traffic ahead of the vehicle is stationary, decelerating or travelling at a speed below a predetermined lower threshold speed such as 10 kph, 15 kph or any other suitable speed, compared with a situation in which traffic ahead is accelerating or travelling at a speed exceeding a predetermined upper threshold such as 20 kph, 25 kph or any other suitable speed. It is to be understood that in some embodiments the value of one or both of the predetermined upper and lower threshold speeds may be determined in dependence at least in part on a prevailing value of vehicle speed limit set by one or more local laws. Other arrangements may be useful in addition or instead in some embodiments.

Conversely, the PEO function may determine that it is likely that the brake pedal 163 will be depressed if traffic ahead of the vehicle is slowing, travelling below the predetermined lower threshold speed or stationary, in which case the value of B_CHOM is updated accordingly.

In another use case, if a driver releases the accelerator pedal 161 at a distance of 700 metres ahead of a roundabout and the information from the RADAR system, the location information and road map information suggest that there is little or no traffic ahead of the vehicle, the PEO function will generate initial values for A_CHOM and B_CHOM that indicate a low chance of a driver CHOM event. The likelihood of the driver demanding either acceleration or braking typically increases as the roundabout draws nearer, and so the values for A_CHOM and B_CHOM are updated as the vehicle progresses to reflect this.

It is also possible for the controller 110 to monitor driver behaviour over multiple driving cycles and to calibrate the PEO function in accordance with the driver's usual style. Accordingly, values generated for A_CHOM and B_CHOM will depend to some extent on the driver's historical decisions.

In the present embodiment, the controller 110 is configured to cause the powertrain to operate in one of four modes:
  (a) Motoring (engine 121 and/or BISG 125 on and transmission 131 connected to the driveline 150)
  (b) Simulated coasting (engine 121 and/or BISG 125 on and transmission 131 connected to the driveline 150)
  (c) Idle coasting (engine 121 on and transmission 131 disconnected from the driveline 150)
  (d) Off coasting (engine 121 off and transmission 131 disconnected from the driveline 150).

In use, the controller 110 is configured to transition between each of these modes in the sequence outlined above, with the option of omitting the idle coasting mode and transitioning directly from the simulated coasting mode to the off coasting mode, as outlined below.

In the 'motoring' mode, the engine 121 and/or BISG 125 are caused to deliver positive torque to the transmission 141 in an amount determined at least in part according to the vehicle speed and accelerator pedal position. The transmission 141 remains connected to the driveline 150.

In the 'simulated coasting' mode, the engine 121 and/or BISG 125 are caused to deliver positive torque to the transmission 141 in an amount sufficient to overcome internal losses associated with the engine 121, transmission 141 and driveline 150. The transmission 141 remains connected to the driveline 150. The amount of the positive torque delivered in order to overcome internal losses is determined in dependence on vehicle speed according to a look-up table that is pre-calibrated by suitable qualified personnel. As discussed in further detail below, the purpose of the simulated coasting mode is to allow for relatively rapid resumption of the motoring mode in the event of a driver change of mind scenario following accelerator pedal lift-off, in which the driver re-depresses the accelerator pedal 161.

Various approaches can be used to implement a simulated coasting mode. These include using the engine 121 alone to supply torque, or using the BISG 125 alone to supply to supply torque.

Alternatively, the engine 121 and BISG 125 can be operated in combination to supply torque. In this case, a weighting factor may be used to determine the division of torque generation between the engine 121 and BISG 125. The weighting factor may be determined to minimise overall power consumption, for example.

Another possibility is to operate the engine 121 to supply excess torque so that the BISG 125 can be charged simultaneously with balancing internal losses in the transmission 141 and driveline 150.

When determining the operating mode to adopt, the controller 110 may consider future energy demands and choose an operating mode that is appropriate in view of available resources. For example, before deciding to use the BISG 125 alone to supply torque during simulated coasting, the controller 110 may check that a state of charge of the battery 126 is sufficient to support subsequent re-starting of the engine 121.

The skilled reader will appreciate that several further options for simulated coasting are available. As the BISG 125 supplies torque through the engine output shaft, in any implementation the simulated coasting mode entails delivering torque from the drive torque means comprising the engine 121 and the BISG 125 through the engine output shaft to the transmission 141 and in turn to the driveline 150.

In the 'idle coasting' mode the engine 121 is fuelled in a manner sufficient to cause it to run at idle speed and the transmission 131 is disconnected from the driveline 150.

In the 'off coasting' mode the engine 121 is switched off and the transmission 131 is disconnected from the driveline 150. In order for the 'off coasting' mode to be allowable, a set of 'off coasting' mode entry conditions must be met, which in the present embodiment are the following two conditions:

(1) Neither of the accelerator pedal 161 and brake pedal 163 are depressed; and
(2) The vehicle speed exceeds a predetermined minimum off coasting entry speed, in the present embodiment 20 kph.

In some embodiments of the present invention, if the vehicle 100 is approaching a corner the PEO function may cause the controller 10 to inhibit the off coasting mode due to the expectation of acceleration in/out of the corner and braking beforehand.

In some embodiments, if the vehicle 100 is determined to be driving on a particular class of highway such as a multi-lane highway such as a multilane motorway, freeway or tollway, and the vehicle speed is significantly less than the legal limit for that stretch of road and traffic appears congested, more dynamic and aggressive driver behaviour can be expected to keep the gap between the vehicle 100 and vehicle ahead substantially constant. In such conditions, the PEO function may be configured to cause the controller 10 to inhibit off coasting. In some embodiments, the PEO function may be configured to inhibit simulated coasting, idle coasting and off coasting.

In use, in the event that the vehicle 100 is travelling with the powertrain 120 in the motoring mode, with the accelerator pedal 161 depressed, and the driver releases the accelerator pedal 161 with the brake pedal undepressed 163, the controller 110 is configured to determine whether the 'off coasting' entry conditions are met. If the 'off coasting' mode entry conditions noted above are met, the controller 110 causes the powertrain 120 to assume the simulated coasting mode immediately in response to the off coasting mode entry conditions being met, and commences timing the amount of time elapsed since the off coasting mode entry conditions were met. The controller 110 prevents the off coasting mode from being assumed until a pre-off coasting mode time period TOC_PRE has elapsed since the entry conditions were met. In the present embodiment TOC_PRE is set to a value of 3 s although other values may be useful in some embodiments.

The controller 110 is configured to cause the powertrain 120 to remain in the simulated coasting mode for a predetermined time period TSC that is calculated when the controller 110 causes the simulated coasting mode to be assumed. The controller 110 determines the value of TSC in dependence on the value of parameter A_CHOM and/or B_CHOM mentioned above. In this way, the controller 110 takes account of an expected coasting time, as implied by the likelihood of a driver CHOM event, when selecting the appropriate powertrain mode.

For example, the higher the value of A_CHOM (and therefore the more likely the driver is to depress the accelerator pedal 161), the higher the value of TSC, i.e. the longer the period for which the powertrain 120 is caused to remain in the simulated coasting mode before switching to the idle coasting mode. If A_CHOM exceeds an upper critical value, in the present embodiment a value of 0.9, the powertrain 120 is caused to remain in the simulated coasting mode for the maximum allowable period TSC_MAX before being caused to assume the off coasting mode directly, without first assuming the idle coasting mode, assuming the driver has not depressed the accelerator pedal 161 in the meantime. In the present embodiment TSC_MAX is 1 s although other values may be useful in some embodiments.

Conversely, the lower the value of B_CHOM (and therefore the less likely the driver is to depress the brake pedal 163) the higher the value of TSC. In this respect, it is noted that it is desirable for the powertrain to be configured in either the idle coasting mode or the off coasting mode in the event that the brake pedal 163 is depressed, for optimised efficiency.

The controller 110 may take the additional step of generating a value for the expected coasting time to enhance the information available to inform the decision regarding the selected powertrain mode.

It is to be understood that because the transmission 131 remains connected to the driveline 150 when the vehicle 100 is in the simulated coasting mode, the powertrain 120 is able to respond to a driver demand for torque, for example by depression of the accelerator pedal 161, more rapidly than if the powertrain 120 has assumed the idle coasting or off coasting modes. In the present embodiment the amount of time required to reconnect the transmission 131 to the driveline 150, or 'time to torque', following detection of depression of the accelerator pedal 161 is around 500 ms although other values may be useful, and achievable, in some embodiments. The actual value may depend substantially at least in part on the engine and transmission employed. It is to be understood that, by 'time to torque', is meant the time from detection of depression of the accelerator pedal 161 to the delivery of a predetermined rate of acceleration, for example 0.07 g.

It is to be understood that, by providing a simulated coasting mode, the powertrain may be caused to be more responsive to driver acceleration following accelerator pedal lift-off (i.e. release) in a change of mind scenario in which the driver releases the accelerator pedal 161 and then re-depresses it shortly thereafter. The simulated coasting mode also provides a smoother transition from a condition of depressed accelerator pedal, to a condition of released accelerator pedal, and back to a condition of depressed accelerator pedal. Accordingly, it is desirable for the simulated coasting mode to be selected whenever the value for A_CHOM is high, for example when surrounding traffic is accelerating or the vehicle 100 is about to pull away at a roundabout or junction.

However, the simulated coasting mode is less fuel efficient than the idle coasting mode and fuel cut overrun, which are in turn less fuel efficient than the off coasting mode. Accordingly it is desirable to minimise the time spent in the simulated coasting mode and to cause the powertrain 120 to transition to the idle coasting mode and ultimately the off coasting mode as quickly as possible following accelerator pedal lift-off.

Accordingly, the controller 110 operates to arbitrate between the best powertrain mode based on predicted CHOM events, and the best powertrain mode in terms of cost to vehicle efficiency over a predicted coasting period. In this way, the controller 110 optimises vehicle operating efficiency in the context of making the vehicle more responsive through use of the simulated coasting mode.

In some embodiments, the controller 110 may receive information indicative of traffic ahead of the vehicle 100 that is obtained at least in part by means of a camera system. Thus in some embodiments if the vehicle 100 is travelling on a multi-lane highway at a speed exceeding a predetermined value such as a value exceeding (say) 70 kph, and the PEO function determines that the amount of traffic ahead of the vehicle 100 is less than a predetermined density, the value of A_CHOM may be relatively low in the absence of other indicators of A_CHOM. In contrast, when travelling on a single lane highway (single lane in only one or in both directions of travel) at a relatively low speed, such as a speed of (say) 60 kph or less, with traffic ahead of the vehicle 100 whilst approaching traffic control lights, the value of A_CHOM may be set to a relatively high value.

Thus it is to be understood that the PEO function may be configured to both determine the length of the period for which the simulated coasting mode is assumed, and whether or not the powertrain is permitted to operate in the simulated coasting mode at a given moment in time.

It is to be understood that if the off coasting mode is unavailable, the powertrain 120 is caused to remain in the idle coasting mode. The off coasting mode may be unavailable, for example, if the engine 121 is required in order to ensure the continued delivery of one or more services such as power to a heating, ventilating and air conditioning (HVAC) system, or if the electrical load placed on the vehicle by one or more other systems is sufficiently high such as an electrical seat heating system, a vehicle lighting system such as a headlight system, or one or more other systems.

In the present embodiment, when the simulated coasting mode is assumed, the controller 110 is configured to determine whether to cause one or both of the engine 121 and BISG 125 to deliver the powertrain torque required for the simulated coasting mode. It is to be understood that the response time of the powertrain 120 to a request to deliver powertrain torque in the motoring mode may be lower if the engine 121 is delivering powertrain torque when operating in the simulated coasting mode compared to a situation in which the BISG 125 alone delivers powertrain torque when the powertrain 120 is operating in the simulated coasting mode. However, the powertrain fuel efficiency is likely to be higher if the BISG 125 alone delivers powertrain torque whilst the powertrain is in the simulated coasting mode compared to a situation in which the engine 121 alone delivers powertrain torque. The decision as to the amount of drive torque to be provided by each of the engine 121 and BISG 125 is determined at least in part by reference to the state of charge of the battery 126.

Figure 2:
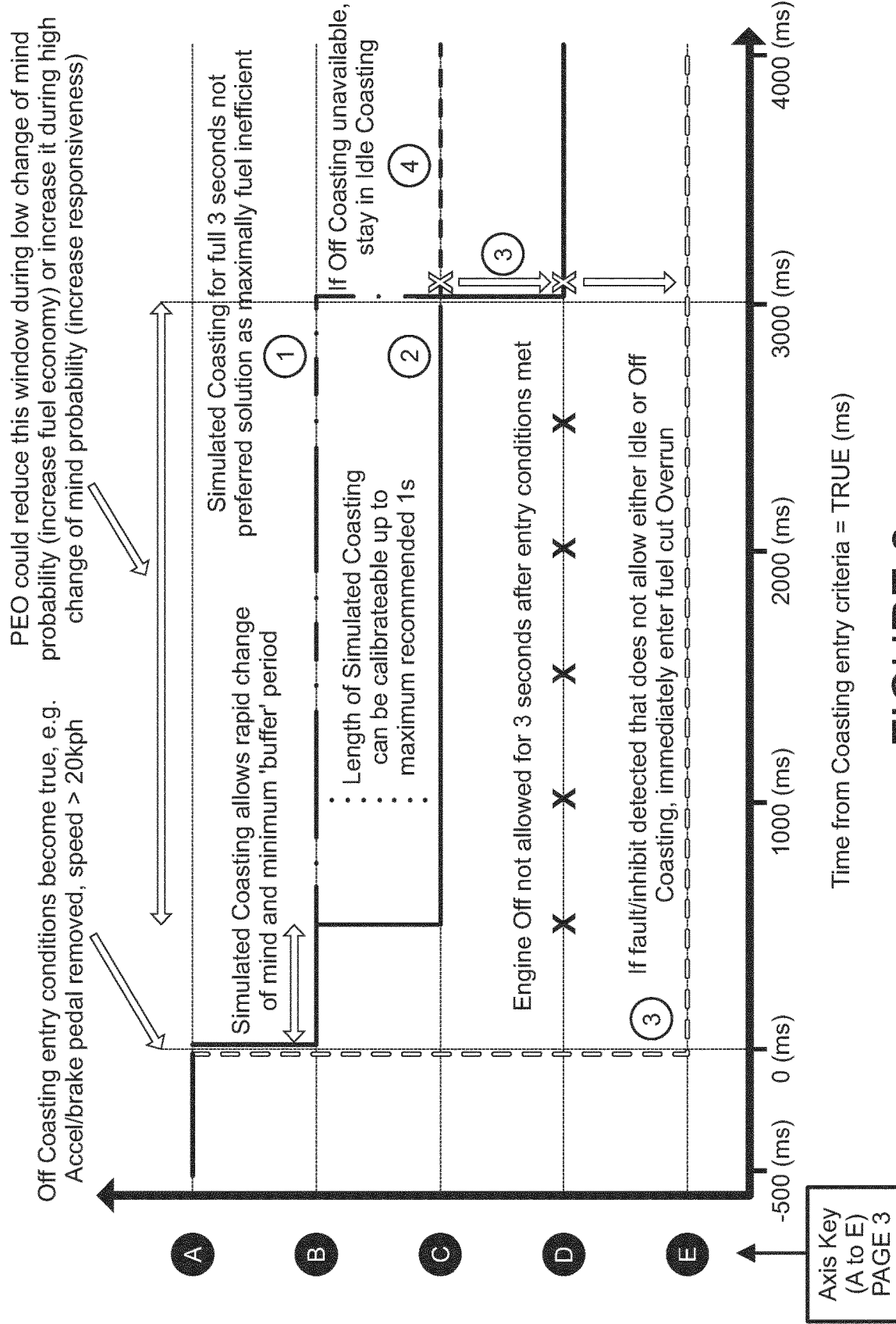
FIG. 2 illustrates schematically an aspect of a powertrain control strategy implemented by a controller in the embodiment of FIG. 1.
Figure 2:
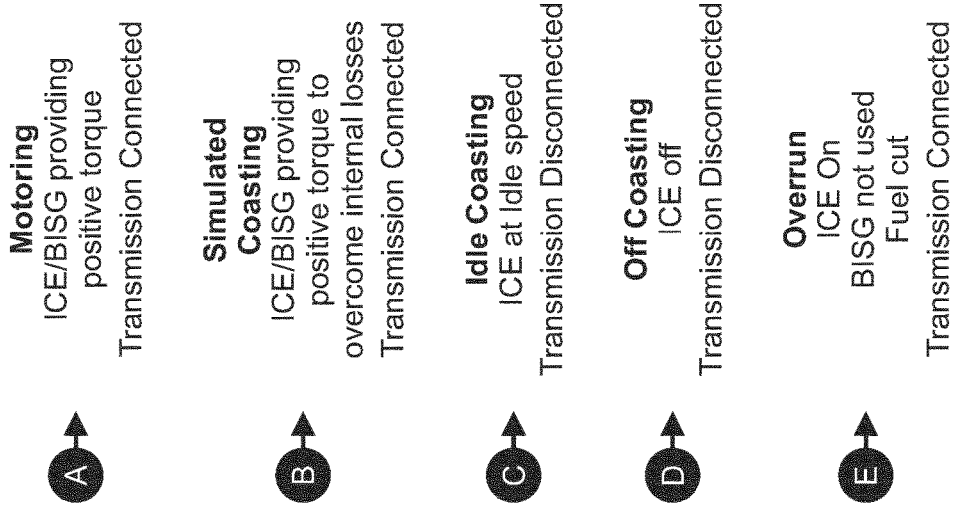

FIG. 2 illustrates schematically aspects of the powertrain control strategy implemented by the controller 110.

From time −500 ms to time 0 s the vehicle 100 is in a motoring condition with the accelerator pedal 161 at least partially depressed by the driver, and in which, typically, the IC engine 121 provides positive drive torque to the transmission 131, optionally in combination with the BISG 125. The transmission 131 is connected to the PTU 141 by means of a clutch device, the PTU 141 forming part of the driveline 150.

At time t=0 ms the driver releases the accelerator pedal 161, without subsequently depressing the brake pedal, whilst the vehicle 100 is travelling at a speed of 40 kph. The controller 110 determines that the 'off coasting' mode entry conditions noted above are met and causes the powertrain 120 to assume the simulated coasting mode. The controller 110 also determines the amount of torque to be developed by each of the engine 121 and BISG 123 during operation in the simulated coasting mode. One of the engine 121 and BISG 123 may be switched off, and the other of the two caused to deliver substantially all of the required torque, depending on the circumstances including for example the state of charge of the battery 126 of the vehicle 100. The controller 110 also commences timing the amount of time elapsed since the off coasting mode entry conditions were met. The controller 110 prevents the off coasting mode from being assumed until the pre-off coasting mode time period TOC_PRE has elapsed since the entry conditions were met, TOC_PRE being set to a value of 3 s in the present embodiment.

The controller 110 then calculates the value of time period TSC in dependence on the value of parameter A_CHOM as discussed above, and causes the powertrain 120 to assume the idle coasting mode once time period TSC has elapsed. In one example scenario illustrated in FIG. 2, a transition from the simulated coasting mode to the idle coasting mode occurs at time t=1000 ms.

The powertrain 120 remains in the idle coasting mode until the TOC_PRE time period has elapsed. At time t=3000 ms the time period TOC_PRE expires, and the powertrain 120 is caused to assume the off coasting mode.

It is to be understood that a similar chain of events may occur in another example where the vehicle 100 is travelling in the motoring condition under the control of the cruise control system 16.

At time t=0 ms the cruise control system 16 may cease to demand powertrain drive torque, for example due to detection of a vehicle directly ahead that is travelling at a lower speed in the same direction. This may occur in this example scenario whilst the vehicle 100 is travelling at a speed of 40 kph. As a consequence of the drop in powertrain torque demand equivalent to release of the accelerator pedal 161, the controller 110 determines that the 'off coasting' mode entry conditions noted above are met and causes the powertrain 120 to assume the simulated coasting mode. The controller 110 also commences timing the amount of time elapsed since the off coasting mode entry conditions were met. The controller 110 prevents the off coasting mode from being assumed until the pre-off coasting mode time period TOC_PRE has elapsed since the entry conditions were met, TOC_PRE being set to a value of 3 s in the present embodiment.

The controller 110 then calculates the value of time period TSC in dependence on the value of parameter A_CHOM as discussed above, and causes the powertrain 120 to assume the idle coasting mode once time period TSC has elapsed. The powertrain 120 remains in the idle coasting mode until the TOC_PRE time period has elapsed. At time t=3000 ms the time period TOC_PRE expires, and the powertrain 120 is caused to assume the off coasting mode.

In some embodiments, the powertrain 120 may be provided with a slip device between the engine 121 and transmission 131 that allows engine speed to be progressively matched to transmission speed. The slip device, which is typically a clutch or torque converter, is principally provided for moving the vehicle from the stationary condition, but also allows the engine to smoothly change speed as different transmission ratios are engaged on the move. In the case of a torque converter, a lock-up clutch is also typically provided to minimize pumping losses in the circulating fluid thereof once the input and output members are substantially coupled. Such a lock-up clutch positively engages the input and output members and is typically a hydraulically deactivated, spring engaged, friction clutch.

In the case of a powertrain having a torque converter with lock-up clutch, when the powertrain 120 is in the motoring or simulated coasting modes the lock-up clutch is arranged to assume the locked-up condition in which substantially no slip is permitted between input and output portions of the torque converter.

When it is determined that the idle coasting mode should be assumed by the powertrain 120, sufficient hydraulic pressure is supplied to the lock-up clutch to cause a partial release thereof whereby the clutch enters a regulated slip control condition to permit engine speed to fall below turbine speed of the torque converter. A suitable control system is implemented in a controller of the lock-up clutch, and may take into account factors such as oil viscosity, oil temperature and maximum allowable speed differential between the engine and the torque converter turbine. Engine speed and turbine speed are sensed to permit feedback control of slip to the intent that engine speed is typically maintained at or close to idle speed, but without fuelling.

In more detail, partial release of the lock-up clutch may be caused to occur once a transition to the idle coasting mode has been commanded by the controller 110. The torque converter is commanded to go from the normal closed (or locked) condition, towards an open state. At a calibrated point, typically individually determined for each transmission ratio, lock-up clutch pressure is regulated with the aim of allowing engine speed to reduce as far as possible whilst remaining above a fuel cut-in value.

As vehicle speed falls, turbine speed inevitably decays towards engine speed, and the pressure applying to the lock-up clutch changes to reduce the relative slip thereof, thus allowing engine speed to be maintained at or above the fuel cut-in value.

Falling vehicle speed may induce a change of gear ratio in the transmission, in which case turbine speed will increase. The system of regulation acts accordingly on the lock-up clutch to again increase slip, so that engine speed continues to be maintained at or close to idle speed, but without fuelling. In an embodiment, control of clutch pressure is the primary control function, and is by reference to a controller memory containing a look-up table of one or more target characteristics, or by reference to an appropriate algorithm.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of controlling a powertrain of a vehicle, the powertrain comprising drive torque means, a transmission and a driveline, the drive torque means comprising an internal combustion engine, the method comprising:
   detecting that coasting entry criteria have been met;
   in response to detecting that the coasting criteria have been met, immediately causing the powertrain to assume a first coasting mode for a first time period in which the drive torque means delivers torque to the driveline to substantially balance powertrain losses;
   determining a value for at least one parameter indicative of a probability that a demand will be made for torque to be delivered to the driveline in addition to torque delivered to substantially balance powertrain losses or a probability that a demand will be made for braking of the vehicle;
   setting the value of the first time period in dependence on the value of the at least one parameter;
   causing the powertrain to assume a second coasting mode from the first coasting mode for a second time period in which the drive torque means is disconnected from the driveline and the internal combustion engine maintains an idle speed; and
   causing the powertrain to assume a third coasting mode from the second coasting mode, wherein in the third coasting mode the drive torque means is disconnected from the driveline and the drive torque means is switched off, wherein determining the value for the at least one parameter comprises determining at least one probability of the probability that the demand for additional torque and the probability that the demand for braking of the vehicle will be made prior to assuming the third coasting mode.

2. The method according to claim 1, wherein the coasting entry criteria comprise release of an accelerator pedal, release of a brake pedal of the vehicle and the vehicle speed exceeding a predetermined value; or torque not being required to be delivered to the driveline to maintain a speed set by a cruise control system within a predetermined range.

3. The method according claim 1, wherein at least one demand of the demand for additional torque and the demand for braking of the vehicle is made by a driver of the vehicle or by a cruise control system to maintain a set speed within a predetermined range.

4. The method according to claim 1, wherein determining the value for the at least one parameter comprises receiving information indicative of at least one selected from the group consisting of speed of traffic ahead of the vehicle, location of traffic ahead of the vehicle, a state of at least one traffic control signal ahead of the vehicle, and information indicative of a geographical location of the vehicle.

5. The method according to claim 1, comprising determining an expected coasting period for the vehicle, and setting the value of the first time period in accordance with the expected coasting period.

6. The method according to claim 1, wherein the drive torque means comprises an electric machine that delivers torque from an output shaft of the engine to the driveline in the first coasting mode.

7. The method according to claim 6, comprising delivering torque produced by both the electric machine and the engine from the output shaft of the engine to the driveline in the first coasting mode.

8. The method according to claim 7, comprising determining proportions of the torque delivered to the driveline that should be produced by the electric machine and the engine respectively for optimized efficiency, and controlling the powertrain so that the engine and the electric machine produce the determined respective proportions of torque.

9. The method according to claim 8, comprising determining proportions of the torque delivered to the driveline that should be produced by the electric machine and the engine respectively to reduce or minimize power consumption in the first coasting mode.

10. A non-transitory computer readable medium including computer readable code for controlling a vehicle to carry out the method of claim 1.

11. An electronic controller for controlling a powertrain of a vehicle, the powertrain comprising drive torque means, a transmission and a driveline, the drive torque means comprising an internal combustion engine, the controller comprising:

an electronic processor having an electrical input for receiving information indicative that coasting entry criteria have been met, and an electronic memory device electrically coupled to the electronic processor and having instructions stored therein, wherein the processor is configured to:

access the memory device and execute the instructions stored therein such that the electronic processor is operable to:

detect that the coasting entry criteria have been met;

in response to detecting that the coasting criteria have been met, immediately cause the powertrain to assume a first coasting mode for a first time period in which the drive torque means delivers torque to the driveline to substantially balance powertrain losses;

determine a value for at least one parameter indicative of a probability that a demand will be made for torque to be delivered to the driveline in addition to torque delivered to substantially balance powertrain losses or a probability that a demand will be made for braking of the vehicle;

set the value of the first time period in dependence on the value of the at least one parameter;

cause the powertrain to assume a second coasting mode from the first coasting mode for a second time period in which the drive torque means is disconnected from the driveline and the internal combustion engine maintains an idle speed; and cause the powertrain to assume a third coasting mode from the second coasting mode, wherein in the third coasting mode the drive torque means is disconnected from the driveline and the drive torque means is switched off, wherein determining a value for the at least one parameter comprises determining at least one probability of the probability that the demand for additional torque and the probability that the demand for braking of the vehicle will be made prior to assuming the third coasting mode.

12. The controller according to claim 11, wherein the coasting entry criteria comprise release of an accelerator pedal, release of a brake pedal of the vehicle, and the vehicle speed exceeding a predetermined value; or torque not being required to be delivered to the driveline to maintain a speed set by a cruise control system within a predetermined range.

13. The controller according to claim 11, wherein determining a value for the at least one parameter comprises receiving information indicative of at least one selected from the group consisting of a speed of traffic ahead of the vehicle, a location of traffic ahead of the vehicle, a state of at least one traffic control signal ahead of the vehicle, and information indicative of a geographical location of the vehicle.

14. A vehicle comprising the electronic controller of claim 11.

* * * * *